(12) United States Patent
Ai et al.

(10) Patent No.: US 8,866,983 B2
(45) Date of Patent: Oct. 21, 2014

(54) DISPLAY MODULE

(75) Inventors: Kun-Chih Ai, Miao-Li County (TW); Shih-Yuan Feng, Miao-Li County (TW); Ching-Yi Tseng, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 13/608,297

(22) Filed: Sep. 10, 2012

(65) Prior Publication Data

US 2013/0083275 A1 Apr. 4, 2013

(30) Foreign Application Priority Data

Sep. 29, 2011 (TW) .............................. 100135186 A

(51) Int. Cl.
*G02F 1/1333* (2006.01)
*G02F 1/1345* (2006.01)

(52) U.S. Cl.
CPC ............... *G02F 1/133308* (2013.01); *G02F 2001/133334* (2013.01)
USPC .............................. 349/40; 349/149; 349/150

(58) Field of Classification Search
CPC .................... G02F 1/133509; G02F 1/136204; G02F 1/133533; G02B 5/223
USPC ............... 349/40, 59, 106, 149–150
See application file for complete search history.

(56) References Cited

U.S. PATENT DOCUMENTS

| 8,300,194 B2 | 10/2012 | Chen et al. | |
| 2009/0027609 A1* | 1/2009 | Kim et al. | 349/158 |
| 2009/0141209 A1* | 6/2009 | Chen et al. | 349/58 |
| 2010/0103355 A1* | 4/2010 | Sakamoto et al. | 349/106 |
| 2010/0182524 A1* | 7/2010 | Nomura | 349/40 |

FOREIGN PATENT DOCUMENTS

| TW | 200736709 | 10/2007 |
| TW | M352223 | 3/2009 |
| TW | I330275 | 9/2010 |

OTHER PUBLICATIONS

English language translation of abstract of TW I330275.
Taiwanese language office action dated Feb. 18, 2014.
English language translation of abstract of TW 200736709 (published Oct. 1, 2007).
English language translation of abstract of TW M352223 (published Mar. 1, 2009).
English language translation of abstract of TW 200925234 (published Jun. 16, 2009).

* cited by examiner

*Primary Examiner* — Nathanael R Briggs
(74) *Attorney, Agent, or Firm* — McClure, Qualey & Rodack, LLP

(57) ABSTRACT

A display module is provided, which includes a display panel and an ESD protection member. The display panel includes a rear substrate, a front substrate, a front polarizer, and an electrical connection layer. The front substrate is stacked on the rear substrate and includes a manifesting area and a perimeter area surrounding the display area. The front polarizer is relative to the manifesting area and is disposed on the front surface of the front substrate. The electrical connection layer is relative to the manifesting area and the perimeter area and is sandwiched between the front polarizer and the front substrate. The ESD protection member, a flexible printed circuit, is connected to the electrical connection layer and is electrically grounded.

12 Claims, 9 Drawing Sheets

DISPLAY MODULE

CROSS REFERENCE TO RELATED APPLICATIONS

This Application claims priority of Taiwan Patent Application No. 100135186, filed on Sep. 29, 2011, the entirety of which is incorporated by reference herein.

BACKGROUND OF THE INVENTION

1. Field of the Invention

The present invention relates to a display module, and in particular relates to a display module in which electrostatic discharge is electrically grounded from the light emitting surface of a display panel.

2. Description of the Related Art

With the advancement in technology, liquid crystal displays (LCD) have been widely applied in various electronic products such as TVs, computer screens, notebook computers, mobile phones and personal digital assistants (PDA).

Electrostatic charges are generated during the LCD panel manufacturing process, such as during LCD panel edge cutting, rubbing, or moving, and enter the LCD panel via the wires extended to the edge of the LCD panel and damage the LCD panel. The LCD panel is more likely to be damaged during fabrication. In some cases, the LCD panel is discarded which results in lower yield rates of the LCD panel. Thus, an electrostatic discharge (ESD) protection mechanism has been disclosed.

For the typical LCD panel (such as TN mode, VA mode, etc.), a conductive electrode is formed at a TFT array substrate and CF substrate, and the electrostatic discharge produced therefrom can be discharged via the conductive electrode. Thus, the charge accumulated in the LCD is discharged. On the contrary, for an in-plane switching (IPS) LCD panel, there is no conductive electrode formed at the CF substrate; therefore, the potential risk from ESD damage is increased due the accumulation of charges therein. To solve this problem, a light transmissive electrode is coated on an outer side of the CF substrate of the typical IPS LCD panel, which is opposite to the side where the LC layer is connected thereto as an ESD protection mechanism.

Please refer to FIG. 1, which shows a conventional display module 1. In the display module 1, the electrostatic discharge from a display panel 11 is guided to a front bezel 13 by a conductive material 12 which is sandwiched between the display panel 11 and the front bezel 13. In order to ensure the conductive material 12 is in contact with the display panel 11 firmly, a pressure is applied by the front bezel 13 in an inward direction. However, a pinch mura defect occurs because the pressure causes rotation of the liquid molecular in the display panel 11. Moreover, misalignment of the conductive material 12 may also occur resulting in the electrostatic discharge not being able to be released.

Please refer to FIG. 2, which shows a conventional display module 2. In the display module 2, the electrostatic discharge from a display panel 21 is guided to a rear bezel 23 by a conductive tape 22 which is connected between the display panel 21 and the rear bezel 23. However, the conductive tape 22 is easily peeled off from the display panel 21, as shown by the dotted line, by an external force produced by mechanical shock while moving the display module 2. Meanwhile, it is difficult to precisely attach the conductive tape 22 to a predetermined position between the display panel 21 and the rear bezel 23 due to the lack of roughness of the conductive tape 22. Also, because the conductive tape 22 may be less sticky while being used in a humid and high temperature environment, after a long time of use in the display module 2, the conductive tape 22 may drop therefrom.

BRIEF SUMMARY OF THE INVENTION

In this regard, the objective of the invention is to provide a display module, in which an ESD protection member with high reliability is disposed on the light emitting side of a display panel, such that the chance of damage of the display module caused from external electrostatic discharge is reduced.

To achieve the above objectives, the present invention provides a display module, which includes: a display panel and an ESD protection member. The display panel includes a rear substrate, a front substrate, a front color filter, and an electrical connection layer. The front substrate is stacked on the rear substrate and includes a manifesting area and a perimeter area surrounding the display area. The front color polarizer is relative to the manifesting area and is disposed on the front surface of the front substrate. The electrical connection layer is relative to the manifesting area and the perimeter area and is sandwiched between the front polarizer and the front substrate. The ESD protection member, which is a flexible circuit board, is connected to the electrical connection layer and is electrically grounded.

By utilizing a flexible circuit board as an ESD protection member, an electrostatic discharge guiding path which is with high reliability and has better electrical conduction performance is provided, so that ESD damage for the display panel can be avoided.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
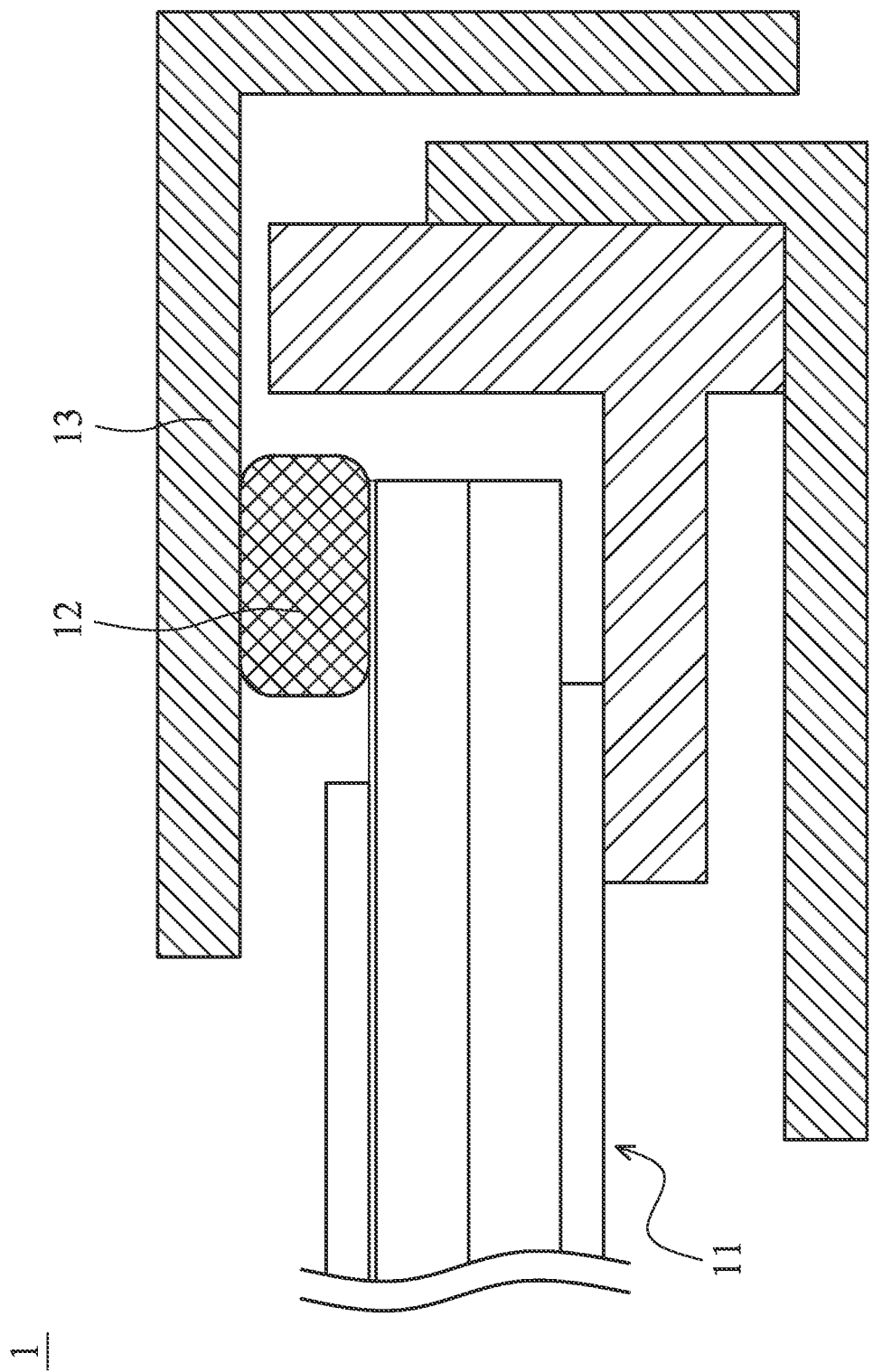
FIG. 1 shows a cross-sectional view of partial elements of a conventional display module.
Figure 2:
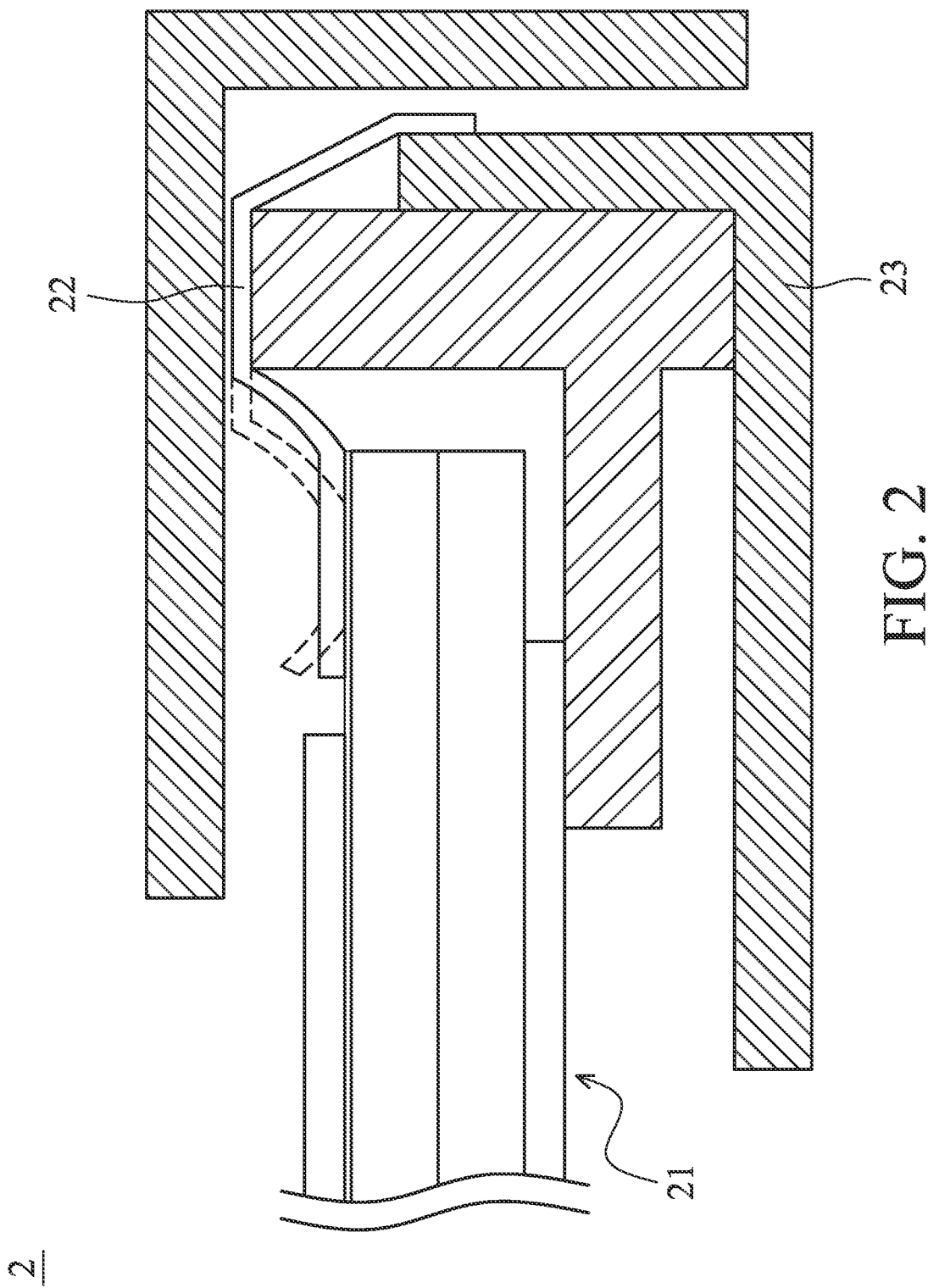
FIG. 2 shows a cross-sectional view of partial elements of a conventional display module.
Figure 3:
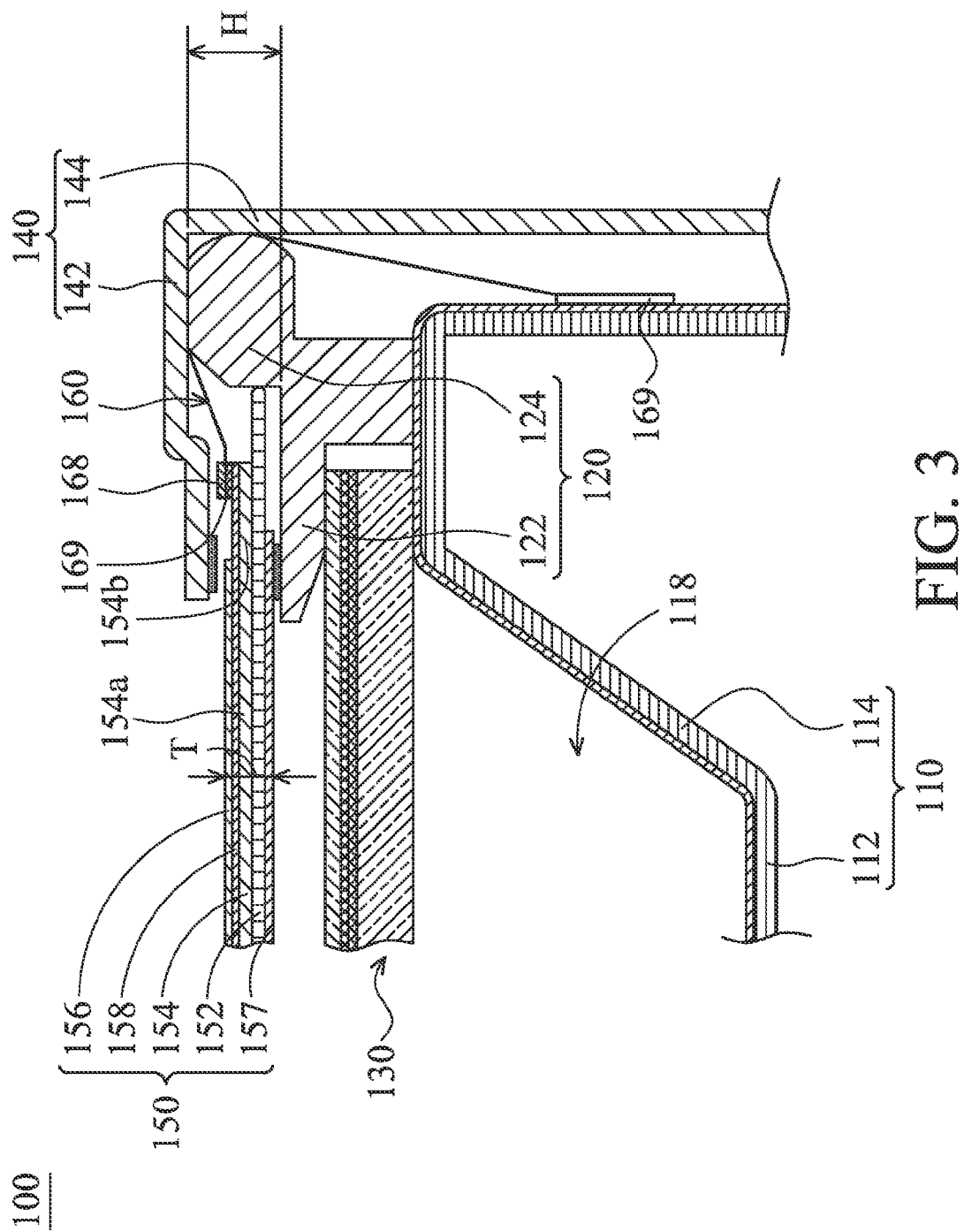
FIG. 3 shows a cross-sectional view of a first embodiment of a display module of the presented invention.

Referring to FIG. 3, a cross-sectional view of partial elements of a display module 100 of the present invention is shown. The display module 100 includes a rear bezel 110, an inner frame 120, an optical sheet 130, an outer frame 140, a display panel 150, and an ESD protection member 160. It should be noted that the "front surface" in this specification refers to the upper portion of the drawing, namely, the one side of the liquid module 100 which manifests an image, while the "rear surface" refers to the lower portion of the diagram.

The rear bezel 110, made of metal material, is disposed adjacent to the rear surface of the display panel 150, and the rear bezel 110 includes a base plate 112 and a side plate 114. The base plate 112 is surrounded by the side plate 114, wherein the side plate 114 extends along a direction toward to the display panel 150 and a space 118 is formed by the side plate 114. In one exemplary embodiment, the space 118 is configured to accommodate a back light module (not shown in FIG. 3).

The inner frame 120 is stacked on the front surface of the side plate 114 and has a protruded supporting portion 122 and a protruded embossed portion 124, wherein the supporting portion 122 extends inward toward to the inside of the display module 100, and the embossed portion 124 extends along a direction away from the base plate 112. In one exemplary embodiment, the inner frame 120 is a resin frame, but it should not be limited. The inner frame 120 may be an electrical conductive metal frame.

The optical sheet 130, sandwiched between the supporting portion 122 and the side plate 114, is configured to scatter light from the back light module (not shown in FIG. 3), so that light provided to the rear surface of the display panel 150 is with uniform distribution.

The outer frame 140 includes a front frame 142 and a side frame 144. The front frame 142 abuts to the embossed portion 124 of the inner frame 120. The side frame 144 is protruded from the rear surface of the front frame 142 and surrounds the side plate 114 of the rear bezel 110.

The display panel 150 is disposed at the front surface of the supporting portion 122. Note that because the height of the embossed portion 124 of the inner frame 120 is larger than the thickness T of the display panel 150, the surface of the display panel 150 is prevented from contacting to the front frame 142. The display panel 150 includes a rear substrate 152, a front substrate 154, a front polarizer 156, a rear polarizer 157, and an electrical connection layer 158. The front substrate 154 is stacked on the front surface of the rear substrate 152, and the front substrate 154 includes a manifesting area 154a and a perimeter area 154b surrounding the display area 154a. The front polarizer 156 is relative to the manifesting area 154b disposed on the front surface of the front substrate 154, and the rear polarizer 157 is disposed at on the rear surface of the rear substrate 152. Additionally, a liquid crystal layer is located between the rear substrate 152 and the front substrate 154, wherein a TFT array and conductive electrodes (not shown) are formed at a side of the rear substrate 152 facing the liquid crystal layer, for driving the liquid molecular in the liquid crystal layer.

The electrical connection layer 158, relative to the manifesting area 154a and the perimeter area 154b, is sandwiched between the front polarizer 154 and the front substrate 156. It is noted that, in one exemplary embodiment, though a portion of the electrical connection layer 158 corresponding to the manifesting area 154a is completely blanketed between the front polarizer 154 and the front substrate 156, the other portion of the electrical connection layer 158 corresponding to the perimeter area 154b is not covered by the front substrate 156. The electrical connection layer 158 is made of Indium Tin Oxide (ITO) or other light transmissive conductive materials.

Figure 4:
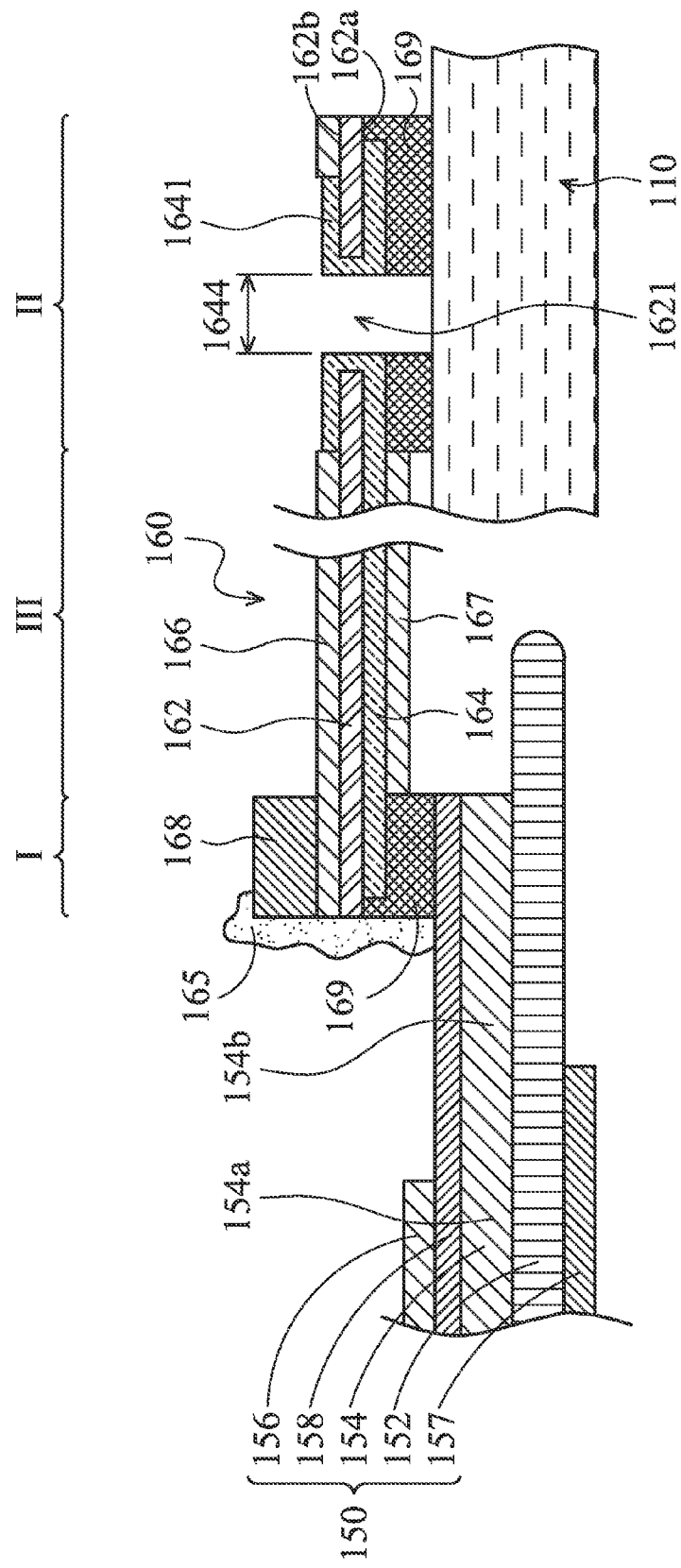
FIG. 4 shows a cross-sectional view of partial elements in FIG. 3 taken along a direction that an ESD protection member extends.
Figure 5A:
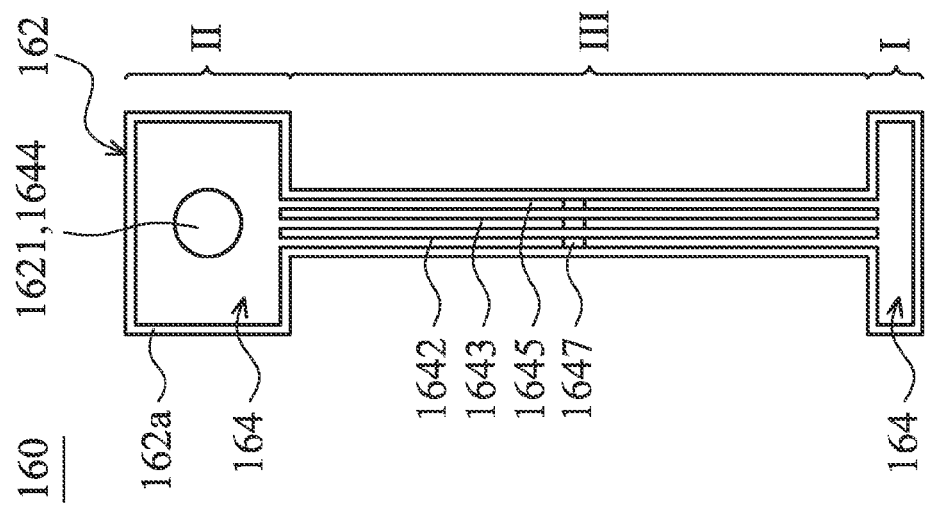
FIG. 5A shows a front view of the ESD protection member of the first embodiment of the presented invention.
Figure 5B:
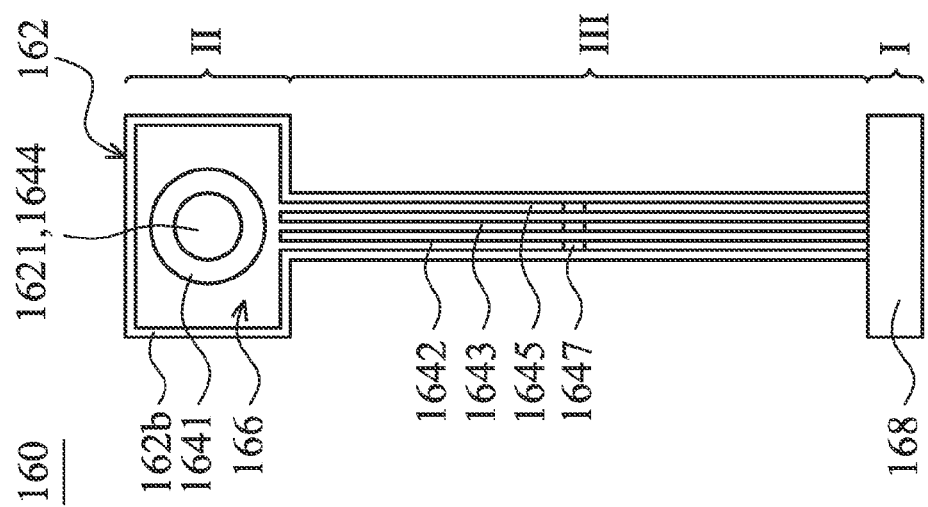
FIG. 5B shows a bottom view of the ESD protection member of the first embodiment of the presented invention

Refer to FIGS. 4, 5A, and 5B. FIG. 4 shows a cross-sectional view taken a long an extending direction of the ESD protection member 160, and FIGS. 5A, and 5B are respectively a front view and a rear view of the ESD protection member 160.

The ESD protection member 160 is a flexible printed circuit (FPC). For purpose of illustration, the ESD protection member 160 is divided into a first segment I and a second segment II, and an elongated segment III, wherein the elongated segment III is connected between the first and second segments I and II. The ESD protection member 160 includes a base layer 162, a conduction layer 164, two protection layers 166 and 167, and a reinforcing member 168. The base layer 162 is a transparent membrane, made of polyethylene terephthalate (PET), but it should not be limited thereto. The base layer 162 relative to the second segment II includes a through hole 1621 penetrating through its substantial center. The width of the base layer 162 relative to the elongated segment III is smaller than that of the base layer 162 relative to the first and second segments I and II. Two surfaces 162a and 162b are consecutively formed at the base layer 162 relative to the first segment I, the second segment II, and the elongated segment III, wherein the surface 162a is opposite to the surface 162b.

The conduction layer 164 is disposed on the surface 162a of the base layer 162. In one exemplary embodiment, the conduction layer 164 is made of material such like copper and is formed on the surface 162a of the base layer 162 by an etching process. The structural features of the conduction layer 164 relative to the first segment I, the second segment II, and the elongated segment III will be elaborated below:

The conduction layer 164 relative to the first segment I is electrically connected to the electrical connection layer 158 corresponding to the perimeter area 154b, and the conduction layer 164 relative to the second segment II is electrically connected to the rear bezel 110 and includes a penetrating portion 1641 disposed in the through hole 1621 and disposed on the surface 162b of the base layer 162. Consequently, the conduction layer 164 relative to the second segment II is exposed to a side of the ESD protection member 160 opposite to a side where the rear bezel 110 is connected. The penetrating portion 1641 includes an engaging hole 1644 penetrating through its substantial center. The conduction layer 164 relative to the elongated segment III is connected to the conduction layer 164 relative to the first and second segments I and II and includes three conductive leads 1642, 1643, and 1645 which are arranged in parallel to each other. A diode 1647 may be optionally connected to at least one of the three conductive leads 1642, 1643, and 1645, so as to limit the direction of current flow. The number of the leads of the conduction layer 164 should not be limited thereto, it may include five, ten, or more.

As shown in FIG. 4. The protection layer 166 is formed on the surface 162b relative to the first segment I, the second segment II, and the elongated segment III. The protection layer 167 is disposed on the conduction layer 164 relative to the elongated segment III; thus, the conduction layer 164 relative to the elongated segment III is not exposed to the outside. Because of the high temperature and high humidity resistant characteristic of the protection layers 166 and 167, while being used at a humid and high temperature environment, the conductive property of the ESD protection member 160 can be made sure. Additionally, because the protection layers 166 and 167 are resilient and flexible, the ESD protection member 160 may not be broken easily due to vibration, so that the reliability of the ESD protection member 160 can be made sure.

The reinforcing member 168 is disposed on the outer surface of the protection layer 166 relative to the first segment I. The reinforcing member 168 and the ESD protection member 160 can be rapidly and precisely mounted on the surface of the display panel 150 during the assembly process. In one exemplary embodiment, the reinforcing member 168 is made of a rigid material, such as Polyacrylate.

Referring to FIG. 4, to ensure that the ESD protection member 160 is stably connected between the electrical connection layer 158 and the rear bezel 110, a conductive paste 169 is accordingly connected between the electrical connection layer 158 and the conduction layer 164 and connected between the rear bezel 110 and the conduction layer 164. In addition, to prevent the ESD protection member 160 from being peeled off from the display panel 150 due to shaking, waterproof glue 165 (such as silicon or Tuffy) is applied between the protection member 160 and the display panel 150, such that, the electrostatic discharge from the display panel 150 is electrically grounded via the electrical connection layer 158, the ESD protection member 160, and the rear bezel 110, consecutively.

Because the base layer 162, the conduction layer 164, and the protection layer 166 relative to elongated segment III of the ESD protection member 160 are pliable, the ESD protection member 160 is able to smoothly extend along the surface of the embossed portion 124 of the inner frame 150. It is noted that though the ESD protection member 160 extends along the surface of the inner frame 150, the ESD protection member 160 is not directly attached thereon. Namely, the ESD protection member 160 is allowed to move or slide freely on the surface of the inner frame 150. Thus, the condition that the ESD protection member 160 is peeled off from the display panel 150 is prevented because the thrust force applied on the ESD protection member 160 due to shaking is released. Additionally, as shown in FIGS. 5A and 5B, because the width of the base layer 162 relative to the elongated segment III is wider than that of the base layer 162 relative to the first and second segments I and II, and because the element and the material set in the first segment I, the second segment II, and the elongated segment III of the ESD protection member 160 are resilient and flexible, the ESD protection member 160 is stronger than the conventional conductive tape while pulling, twisting, or bending. Moreover, because the conduction layer 164 of the ESD protection member 160 is made of material such like copper, the ESD protection member 160 is endurable against an instant voltage that is higher than 20 kV without affecting operation of display panel 150.

Figure 6:
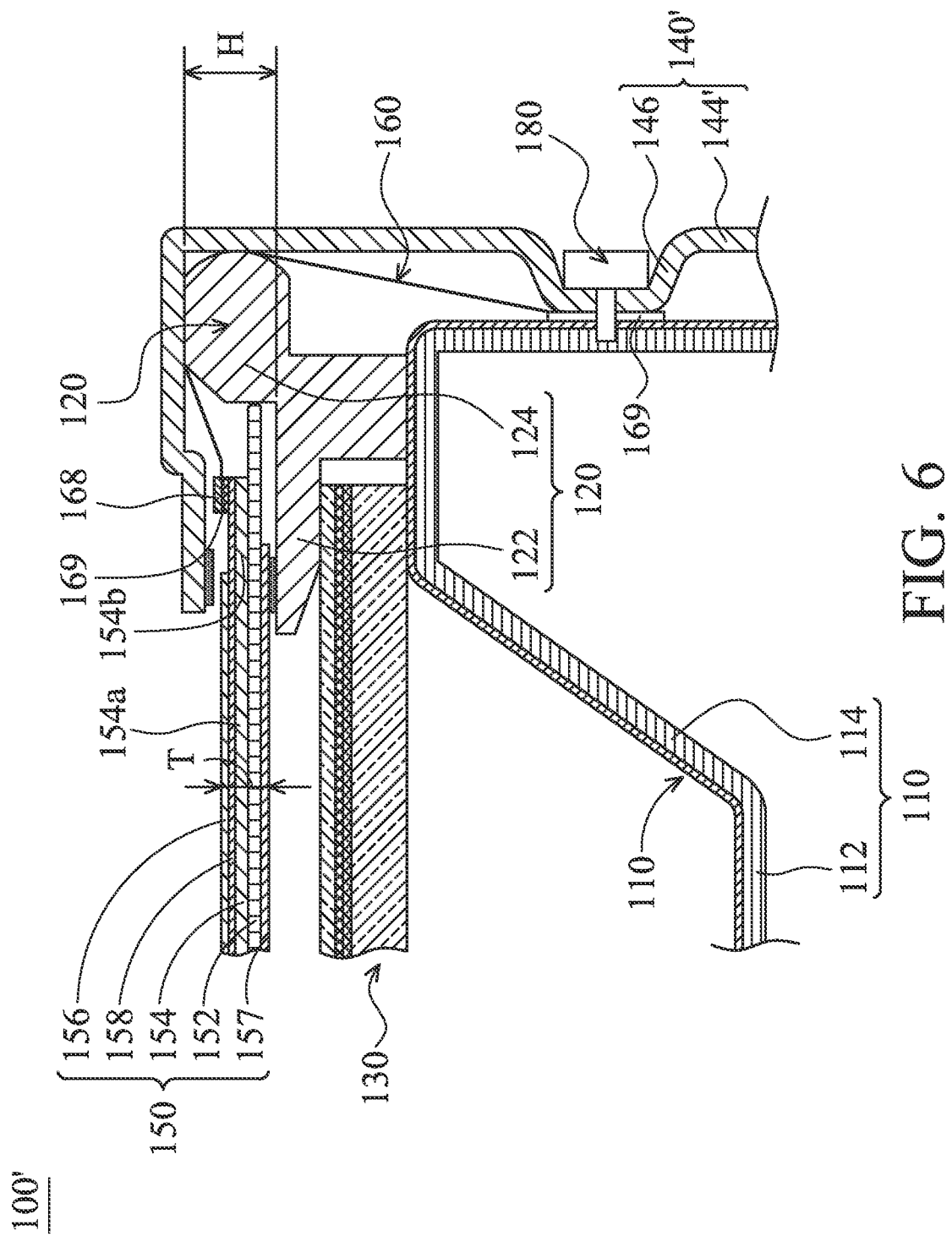
FIG. 6 shows a cross-sectional view of a second embodiment of a display module of the presented invention.
Figure 7:
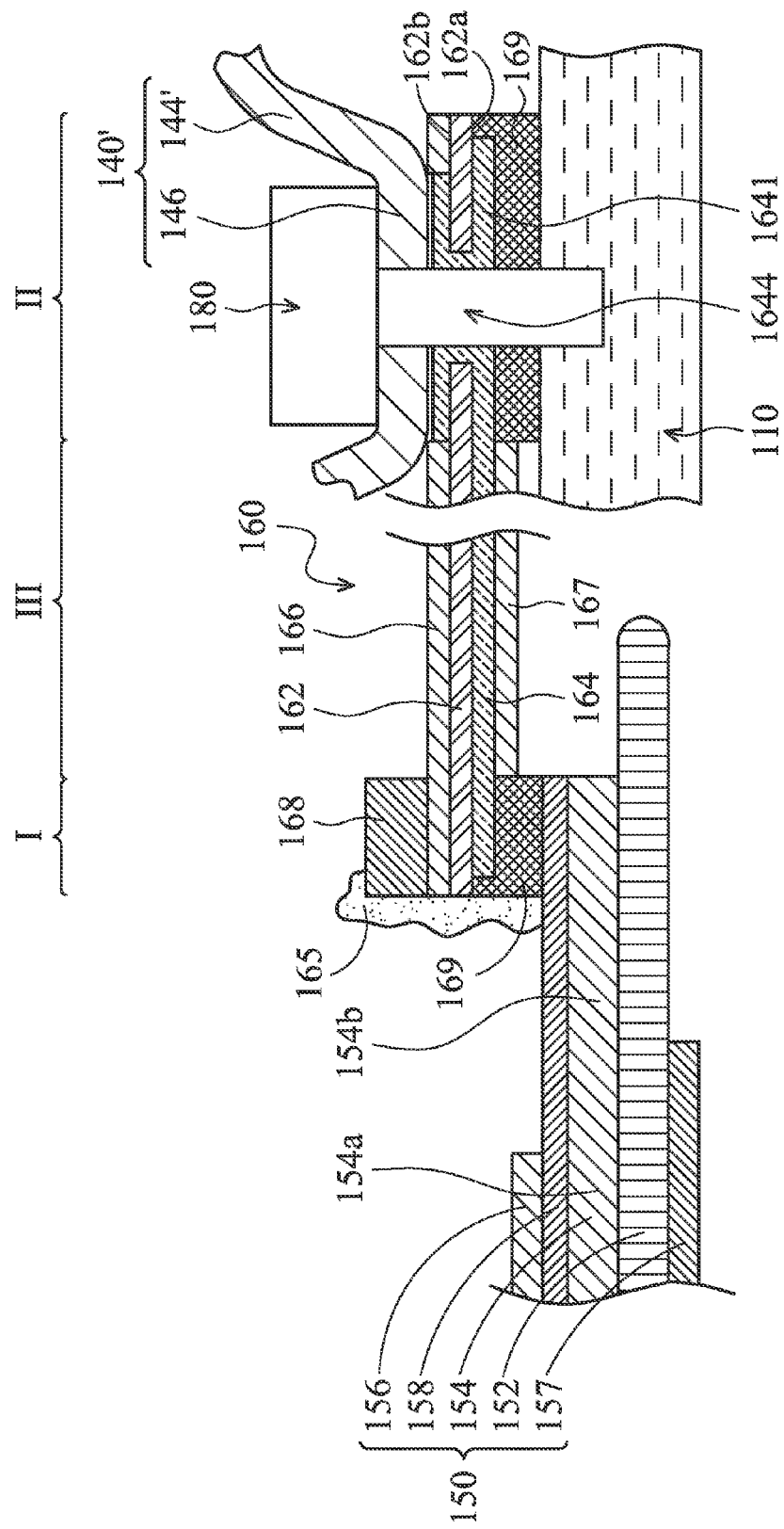
FIG. 7 shows a cross-sectional view of partial elements in FIG. 6 taken along a direction that the ESD protection member extends.

It is noted that, due to the arrangement of the conduction layer 164 in which the penetrating portion 1641 is disposed in the through hole 1621 and is exposed to a side of the ESD protection member 160 opposite to a side where the rear bezel 110 is connected, both sides of the ESD protection member 160 is capable of being grounded; thus, the ESD protection member 160 is suitable for any types of display modules. This innovative result can be better understood with descriptions of the following embodiments:

Refer to FIGS. 6 and 7. FIG. 6 shows a cross-sectional view of a second embodiment of the display module 100' of the present invention. Hereafter, elements substantially similar to that of the first embodiment are designated with like reference numbers and explanations that have been given already will be omitted. Differences between the display module 100 and display module 100' are described below. A side frame 144' of an outer frame 140' includes a recess 146 depressed inwardly from the side frame 144'. A fixing member 180, a conductive material, is disposed in the recess 146, wherein the fixing member 180 passes through the engaging hole 1644 of the penetrating portion 1641 and is connected to the rear bezel 110. In one exemplary embodiment, the fixing member 180 is a screw which is fixed on the penetrating portion 1641, a conductive material, by screw arrangement. Therefore, if the rear bezel 110 is made by insulating material or material that is not easily conductive, the electrostatic discharge from the light emitting surface of the display panel 150 is guided to the outer frame 140' via the electrical connection layer 158, the ESD protection member 160, and fixing member 180, consecutively. In some embodiments, conductive paste 169 may be applied between the rear bezel 110 and the conduction layer 164 to improve reliability.

Figure 8:
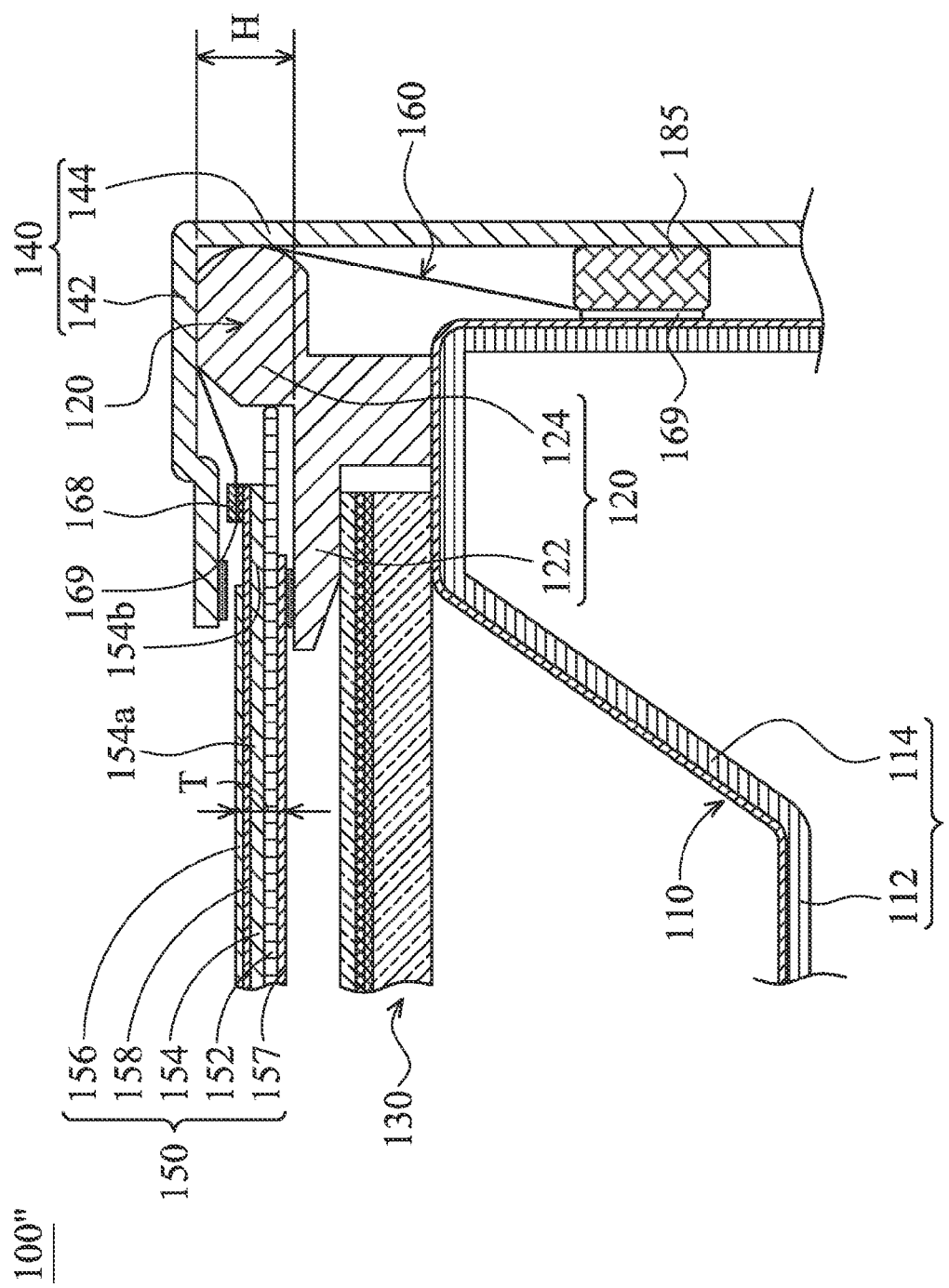
FIG. 8 shows a cross-sectional view of a third embodiment of a display module of the presented invention.
Figure 9:
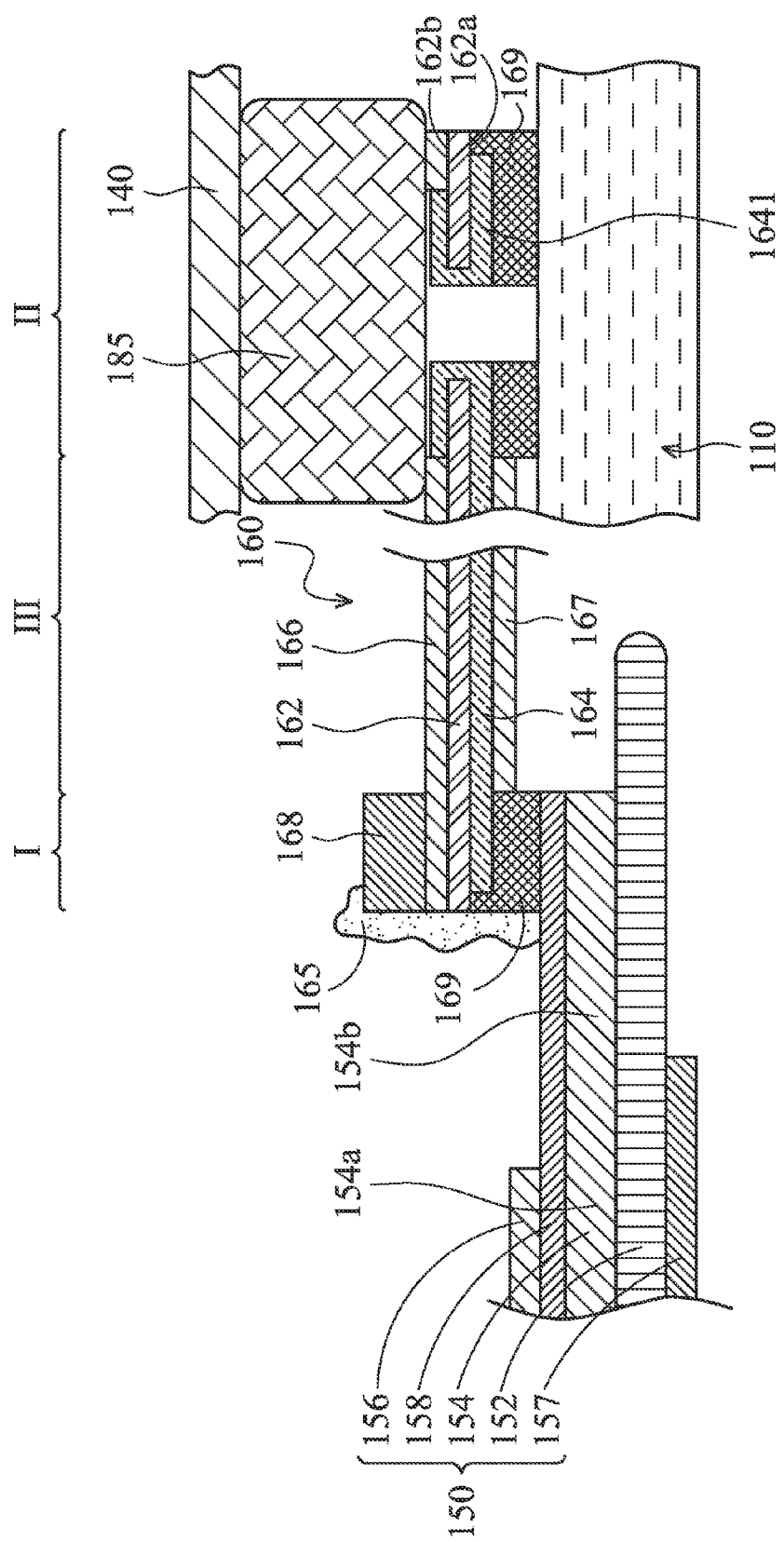
FIG. 9 shows a cross-sectional view of partial elements in FIG. 8 taken along a direction that the ESD protection member extends.

Refer to FIGS. 8 and 9. FIG. 8 shows a cross-sectional view of a second embodiment of the display module 100" of the present invention. Hereafter, elements substantially similar to that of the first embodiment are designated with like reference numbers and explanations that have been given already will be omitted. Differences between the display module 100 and display module 100" are described below. In this embodiment, a conductive material 185 relative to the penetrating portion 1641 is disposed between the ESD protection member 160 and the outer frame 140 to provide another electrostatic discharge path. In the other embodiments, the conductive material 185 is a conductive foam (conductive fabric), wherein a plurality of conductive particles (not shown in the figure) are disposed in a spinning fabric (not shown in the figure), such that, the electrostatic discharge from the light emitting surface of the display panel 150 is guided to the outer frame 140 to make ground connection via the electrical connection layer 158, the ESD protection member 160, and the conductive material 185, consecutively.

Referring to FIG. 4, the arrangement of the second segment II of the ESD protection member 160 should not be limited to the embodiment above. In an embodiment, not shown in the figure, an ESD protection member is directly connected to the outer frame via a conductive paste. Additionally, because the ESD protection member 160 is thin and pliable, with 1 mm in thickness in one exemplary embodiment, the second segment II of the ESD protection member 160 may be disposed in any tiny slit in the display module and be made electrically grounded.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display module, comprising:
   a display panel, comprising:
   a rear substrate;
   a front substrate, stacked on the rear substrate and comprising a manifesting area and a perimeter area surrounding the manifesting area;
   a front polarizer, relative to the manifesting area, disposed on a front surface of the front substrate; and
   an electrical connection layer, relative to the manifesting area and the perimeter area, sandwiched between the front polarizer and the front substrate; and an ESD protection member, connected to the electrical connection layer and electrically grounded, wherein the ESD protection member is a flexible printed circuit and comprises:
a first segment, fixed at the electrical connection layer via a conductive paste;
a second segment, electrically connected to an metal frame via the conductive paste; and
an elongated segment, connecting the first segment to the second segment and arranged to move or slide freely, wherein the width of the elongated segment is smaller than the width of the first segment or second segment.

2. The display module as claimed in claim 1, wherein the ESD protection member is electrically connected to a portion of the electrical connection layer corresponding to the perimeter area.

3. The display module as claimed in claim 2, further comprising a reinforcing member, disposed on a side of the ESD protection member opposite to a side where the electrical connection layer is connected.

4. The display module as claimed in claim 1, wherein the ESD protection member is connected to the electrical connection layer via a conductive paste.

5. The display module as claimed in claim 1, wherein the ESD protection member further comprises:
a base layer, wherein the base layer relative to the second segment comprises a through hole penetrating therethrough; and
a conduction layer, disposed on the base layer relative to the first and second segments,
wherein the conduction layer relative to the first segment is electrically connected to the electrical connection layer, and the conduction layer relative to the second segment is disposed in the through hole.

6. The display module as claimed in claim 5, wherein the ESD protection member further comprises a plurality of conductive leads disposed on the base layer relative to the elongated segment.

7. The display module as claimed in claim 5, further comprising a rear bezel, adjacent to a side of the rear substrate opposite to a side where the front substrate is connected, wherein the conduction layer relative to the second segment is connected to the rear bezel.

8. The display module as claimed in claim 7, further comprising a conductive paste, connected between the rear bezel and the conduction layer relative to the second segment.

9. The display module as claimed in claim 7, further comprising a fixing element, interconnected between the rear bezel and the conduction layer relative to the second segment.

10. The display module as claimed in claim 7, wherein the conduction layer disposed in the through hole comprises a penetrating portion, and the penetrating portion is exposed to a side of the ESD protection member opposite to a side where the rear bezel is connected, wherein the penetrating portion is made ground connection.

11. The display module as claimed in claim 10, further comprising a frame surrounding the display panel, wherein the penetrating portion is electrically connected to the frame and is electrically grounded.

12. The display module as claimed in claim 11, further comprising a conductive material, disposed between the penetrating portion and the frame.

* * * * *